United States Patent
Ekner

(10) Patent No.: US 9,729,259 B2
(45) Date of Patent: Aug. 8, 2017

(54) SYSTEM AND A METHOD FOR IDENTIFYING A POINT IN TIME OF RECEIPT OF A DATA PACKET

(75) Inventor: Peter Ekner, Hillerød (DK)

(73) Assignee: Napatech A/S, Søborg (DK)

( * ) Notice: Subject to any disclaimer, the term of this patent is extended or adjusted under 35 U.S.C. 154(b) by 301 days.

(21) Appl. No.: 14/238,753

(22) PCT Filed: Aug. 30, 2012

(86) PCT No.: PCT/EP2012/066895
§ 371 (c)(1),
(2), (4) Date: Feb. 13, 2014

(87) PCT Pub. No.: WO2013/030298
PCT Pub. Date: Mar. 7, 2013

(65) Prior Publication Data
US 2014/0211816 A1    Jul. 31, 2014

Related U.S. Application Data

(60) Provisional application No. 61/530,763, filed on Sep. 2, 2011.

(51) Int. Cl.
*H04J 3/06* (2006.01)
*H04L 7/033* (2006.01)
(Continued)

(52) U.S. Cl.
CPC .......... *H04J 3/0697* (2013.01); *H04L 7/0331* (2013.01); *H04L 7/0012* (2013.01); *H04L 7/04* (2013.01)

(58) Field of Classification Search
CPC ....... H04L 7/0079; H04L 7/04; H04L 7/0008; H04L 7/0087; H04L 7/0331; H04L 69/22;
(Continued)

(56) References Cited

U.S. PATENT DOCUMENTS 5,835,498 A * 11/1998 Kim ................... G06F 13/4018
                                                          348/423.1
6,295,563 B1 * 9/2001 Whittaker ................. H03L 7/06
                                                             710/52
(Continued)

FOREIGN PATENT DOCUMENTS

JP    2006109426    4/2006
JP    2006250824    9/2006
(Continued)

OTHER PUBLICATIONS

Huang, Dawei, et al., "Low latency low power analog baud rate clock data recovery for SERDES," Research Disclosure, Apr. 2007, pp. 344-348.

*Primary Examiner* — Kwang B Yao
*Assistant Examiner* — Ricardo Castaneyra
(74) *Attorney, Agent, or Firm* — McHale & Slavin, P.A.

(57) ABSTRACT

A de-serializer, such as forming part of a SERDES, in which a point in time of receipt, on the serial data path, of receipt of a particular part of a data packet, such as an SOF, is determined from when that part is output on the parallel data path from knowledge of the clock controlling the parallel data path as well as which of the parallel lanes the part is output on.

10 Claims, 2 Drawing Sheets

(51) Int. Cl.
*H04L 7/00* (2006.01)
*H04L 7/04* (2006.01)

(58) Field of Classification Search
CPC ... H04L 7/033; H04L 7/00; H04L 7/10; H04L 1/0045; H04L 12/40013; H04L 25/03012; H04J 3/0697; H04J 3/0685
See application file for complete search history.

(56) References Cited

U.S. PATENT DOCUMENTS

| | | |
|---|---|---|
| 7,535,844 B1 | 5/2009 | Gulstone |
| 7,706,433 B2 | 4/2010 | Chan et al. |
| 2005/0220089 A1* | 10/2005 | Kawashima .......... H04J 3/0608 370/366 |
| 2006/0050827 A1 | 3/2006 | Saeki et al. |
| 2007/0229342 A1 | 10/2007 | Baba |
| 2008/0292322 A1 | 11/2008 | Daghighian et al. |
| 2009/0154300 A1 | 6/2009 | Tabatabaei |
| 2009/0235218 A1* | 9/2009 | Wahl .................... G06F 9/3869 716/113 |

FOREIGN PATENT DOCUMENTS

| | | |
|---|---|---|
| JP | 2011151675 | 8/2011 |
| JP | 2011166383 | 8/2011 |
| WO | 2011/059439 | 5/2011 |

\* cited by examiner

SYSTEM AND A METHOD FOR IDENTIFYING A POINT IN TIME OF RECEIPT OF A DATA PACKET

CROSS-REFERENCE TO RELATED APPLICATIONS

This application is a §371 national stage entry of International Application No. PCT/EP2012/066895, filed Aug. 30, 2012, which claims priority to U.S. Provisional Patent Application No. 61/530,763 filed Sep. 2, 2011, the entire contents of which are incorporated herein by reference.

FIELD OF THE INVENTION

The present invention relates to a system for and a method of time stamping a data packet or identifying a point in time of receipt of the data packet.

Figure 1:
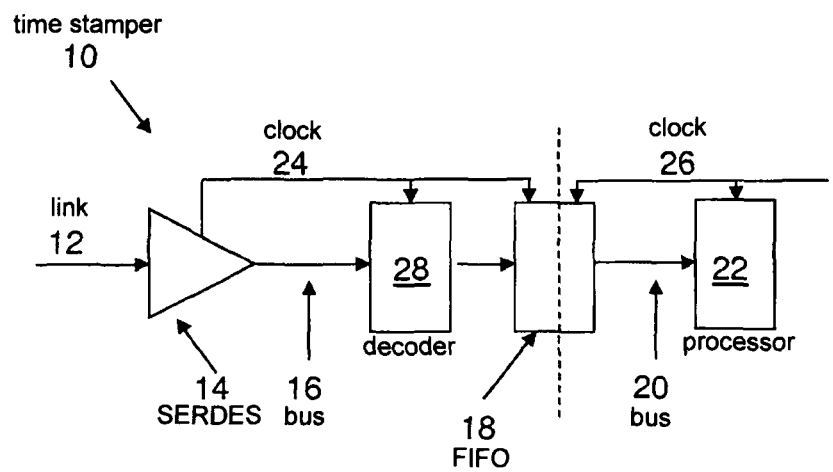

In usual communication, data packets are transported over the longer distances as serial data on one or more data paths or cables. This is illustrated in FIG. 1. When such data is to be detected and used or analyzed, the data is detected from the serial link 12 and converted into parallel data and fed onto a parallel data bus 16 in order to reduce the frequency required of the analyzing circuits. This conversion usually is performed in a Serializer/Deserializer or SERDES 14 of the time stamper 10. The de-serializer 14 derives a clock signal from the link 12, divides this by the width of the bus 16 and outputs the data on the bus 16 according to this reduced clock signal 24, which is also output. The de-serialized data is then fed to a number of asynchronous FIFOs 18 in order to allow the data to flow from one clock domain (clock 24) to another clock domain (clock 26). Between the SERDES 14 and the FIFOs 18, a decoder 28 may be provided for removing a coding of the serial data received. This coding may be a 64b/66b coding or a 6b/8b-coding. This decoding is controlled by the clock 24. Another clock domain is present at the other side of the FIFOs 18 and this clock 26 controls the reading out of parallel data from the FIFOs 18 to a parallel bus 20 as well as any subsequent processing thereof in the processor 22, such as time stamping.

The reason for the two clock domains lies in the fact that there may exist ppm differences between the frequency with which the serial data is forwarded on the link 12 and that with which the data is analyzed further along the data path 20. This is handled by the FIFOs 18 and a data/packet drop policy which ensures that the FIFOs 18 do not overrun. Typically, idle data/packets are introduced in the serial data to allow for such dropping without dropping data packets.

Time stamping of a data packet received on the serial link 12 is performed in the second clock domain by identifying a point in time where a Start Of Frame header (SOF) is recognized on the parallel data path 20 reading data out of the FIFOs 18.

It is noted that a number of setups as illustrated in FIG. 1 may be provided in parallel so as to increase the overall transmission bandwidth. In this situation, data packets or blocks are sequentially fed to the links 12, such as using a round robin strategy, whereby the SOF will be present in one of the busses 20.

This time stamp, however, is very imprecise. Firstly, the potential data (e.g. idle symbols) dropping will make it impossible to determine the time of outputting a SOF, from e.g. a point in time of reading the SOF on the bus 20, as it is not known how many, if any, packets have been dropped. In addition, as the clock frequency on the parallel busses 16 and 20 is lower (divided by the bus width) than that of the bus 12, the granularity of the time stamp is also lower (multiplied with the bus width). This time stamp will be the same independently in which lane of the bus 20 the SOF is identified.

Furthermore, usually, the SERDES 14, bus 16 and FIFOs 18 are provided in so-called PHYs, the output of which desirably conforms to e.g. the XAUI or MII/GMII standards, whereby it may be desired to e.g. have the SOF provided at the first lane of the bus 20, or where further delays are introduced to align the data on the individual busses 20, if multiple setups as that of FIG. 1 are used. In this situation, the time stamping uncertainty increases again.

The present invention relates to a solution to this problem and a set-up in which the time stamp determination may be made much more precise.

In a first aspect, the invention relates to a system for identifying a point in time of receipt of a data packet having a predetermined part, the system comprising:

a de-serializer for:
  receiving serial data from a serial data path,
  deriving a first clock signal with a first frequency from the serial data path,
  deriving a second clock signal with a second frequency, the second frequency being the first frequency divided by a predetermined integer, and
  outputting parallel data to a parallel data bus having a predetermined number of parallel data paths, the parallel data relating to the serial data, and the parallel data being output in accordance with the second clock signal, an identifier adapted to identify one of the parallel data paths in which at least a portion of the predetermined part is output, a timing device adapted to estimate the point in time from the identified one of the parallel data paths and the second clock signal.

In this context, the system may be formed by a single element, such as a single circuit/chip/FPGA, or it may be formed by a number of elements adapted to communicate with each other via electrical, optical, electromagnetic signals or the like. Thus, the individual elements may be positioned close to each other, such as in the same housing and/or on the same Printed Circuit Board, or may be positioned more remotely, such as within separate housings, different rooms or different buildings.

The present system may form part of a larger system, such as a network analyzer, a switch, a router, or the like, where the point in time of receipt of data is determined. This point in time may be used for a number of purposes, such as to ensure maintaining an order of the data packets.

A data packet may be any type of a data unit to be transmitted on or transported by a network, data cable, data bus, trunk, or the like. Normally, a data packet/unit conforms to one or more data standards, such as the Ethernet, SONET, Infiniband or Fibrechannel standard being an umbrella under which a number of different standards or data packet types exist, such as UDP and TCP data packets. A data packet usually has a number of different information items or types, such as address data, payload or the like, which are each positioned at well defined or known positions within the data packet. Such positions and types will typically differ from data packet type to data packet type, but usually, the data packet type, and thus the positions of individual contents thereof, may be determined from the actual data packet, where after the individual data items, such as address data and/or payload, may be derived, altered, and/or used in any type of analysis. The type or standard may be derived directly from the data packet, such as when a particular data item of the packet identifies the type/standard, or may be derived from data derived from the data packet, such as on the basis of recognition of types and positions of data items of the data packet and subsequently determination of type(s) or standard(s) of data packet in which such data may be found at such position(s).

Also, a data packet may be or have been encoded, such as in order to provide an error check, so as to provide a sufficient zero crossing density in the signal, or as is seen when breaking an initial data packet into smaller parts which are then transmitted over a network with a header describing the contents of the part. Different encoding techniques exist for different purposes. Encoding techniques comprise codes, such as Manchester code, 4b/5b, 6b/8b, 8b/10b, 64b/66b, 64b/67b and 128b/130b encoding wherein e.g. 4 bits of the original data packet are encoded into 5 bit blocks which are then forwarded and later on de-coded into the original packet.

Clearly, a packet or unit has a well defined starting bit/byte and well defined contents or parts. Often, a packet has one or more required elements, such as an address or encoding header, and one or more optional elements, such as payload.

The point in time may be derived or defined in a number of manners, and exactly which point in time is not as relevant as long as all data packets have their points in time determined in the same manner. Naturally, this may also be made dynamic, so that the actual part to be identified may be defined individually for each packet, packet type, protocol or the like.

Naturally, a delay, such as from one or more pipelined steps between the receipt of the serial data and the outputting of the parallel data, may exist. This delay may be taken into account when determining the point in time.

The point in time may be that when the first (or last) bit of the data packet reaches the de-serializer, or the point in time may be offset from that point in time. The point in time may alternatively or additionally be that at which another part of the data packet reaches the de-serializer, or it may be offset there from.

Any of the above parts of the data packet may be identified and used for deriving the point in time.

In this context, serial data is data transmitted bit by bit, such as on a serial cable or wirelessly. Thus, every part, such as every bit or byte, of the serial data has different points in time of transmission and receipt. Serial data may be received from an electrical, optical or wireless link, such as from a computer, a server, a network element, a switch, a router, or the like. Alternatively, the serial data may be received from any type of storage element, antenna or other receiver/transmitter.

Parallel data, on the other hand, is output more than one bit at the time. This may be seen when outputting the data on a plurality of parallel electrical conductors, a so-called data bus, where a number of bits, corresponding to a so-called width of the bus, are output and transmitted simultaneously, such as on the same clocking signal. Usually, parallel data is output on a number of parallel conductors, but it is also possible to simultaneously output data on multiple wavelengths or frequencies in optical cables, electrical cables and/or wirelessly over the air.

A clock signal may be derived from the data in a number of manners, such as from zero point crossings thereof. As mentioned, the serial data may be adapted to have a sufficient number of zero point crossings so that a timing or clock signal can be derived.

Alternatively, the clock signal may be derived from other characteristics of the signal if desired.

The first frequency thus is preferably the frequency with which bits of the serial signal are transmitted and/or received.

A de-serializer thus receives the signal or data and feeds the data onto a parallel data bus with a predetermined number of data paths or conductors. Preferably, the parallel data is output with a frequency being the first frequency divided by the width (number of bits transmitted in parallel; number of parallel conductors in the case of an electrical data bus) of the data bus. In this manner, the bandwidth into and out of the de-serializer is the same.

In this context, the parallel data relates to the serial data when either the same number of bits/bytes are output as received, or an amount of removed or added data is known. Preferably, no overall data is removed. Thus, bits/bytes may be replaced in data packets or between data packets, but no bits/bytes are dropped without replacing. This replacement preferably is bit for bit or byte for byte. If data is dropped, this information may be fed to the timing device in order for it to take this into account. This replacing may be the removal of undesired headers or data packets, such as idle packets, and these parts may be replaced by any type of information, as long as the overall number of bits/bytes is the same. As will be explained further below, this makes it possible to, from the second clock and the parallel path ID, determine e.g. a point in time of receipt of the same data from the serial link.

If data is removed or added, the point in time may still be determined, such as if the manner in which the serial and (any) added data—or the reduced serial data—are forwarded to the parallel lanes.

The above integer may be any integer larger than 1, and is normally a factor of 2: 2, 4, 8, 16, 32, 64, 128, 512 or the like.

Preferably, the data output on the parallel data paths/conductors is output simultaneously, even though it will be possible to output this data at different points in time, as long as the frequency of outputting data on to each path/conductor is the second frequency.

Even though any manner or scheme may be used for determining, for each data bit received from the serial data path, to which of the parallel data paths/conductors to forward that bit, it is preferred that a round robin scheme is used, where consecutive data bits are fed to consecutive data paths/conductors, and where, when a bit has been fed to the last path/conductor, the next bit is fed to the first path/conductor.

The point in time relates to on which of the lanes/paths/conductors the predetermined part of the data packet is output. The predetermined part, as is described above, may be any part of a data packet. The outputting of the data on the parallel paths/conductors is timed by the second clock signal.

The identification of the part of the data packet usually will require an analysis of the packet as is usual in the art. In some instances, the parts are spaced with a known number of bits, whereby no analysis but simply a counting or calculation may be sufficient.

Thus, the identifier is adapted to identify on which one of the parallel data paths the at least a portion of the predetermined part is output, where after the timing device is adapted to estimate the point in time.

When the number of bits/bytes received from the serial link is the same as that output on the parallel paths/bus, and when the scheme is known for controlling on which of the parallel paths data is output, the point in time of the second clock signal for outputting the predetermined part and the parallel path/conductor thereof may be used for calculating the point in time of the first clocking signal of receiving that part of the data packet, for example.

In a preferred embodiment, the system further comprises one or more First-In-First-Out elements for receiving data from the parallel data paths and outputting data according to a third clock signal. Usually, the bandwidth into and out of the FIFOs is the same, at least over time. Otherwise, data may have to be dropped, if the FIFOs overrun. At this position in the circuit, it may be usual to drop e.g. idle packets and other superfluous information. However, the phase of the clocks in the two clock domains (second and third clock) may vary over time, which is the overall reason for providing such clock boundaries.

In one embodiment, the system further comprises:
one or more additional de-serializers, each for:
  receiving serial data from a separate serial data path,
  outputting parallel data to a separate parallel data bus having a predetermined number of parallel data paths, the parallel data relating to the serial data, and the parallel data being output in accordance with an additional clock signal,
wherein the identifier is adapted to identify one of the parallel data paths in which at least a portion of the predetermined part is output, and
wherein the timing device is adapted to estimate the point in time from the identified one of the parallel data paths and the second clock signal in accordance with which the parallel data is output to the identified one of the parallel data paths.

Thus, the additional de-serializer(s) can be of the same type as that described further above, but may be more simple, as they need not determine the first and second clocks. Especially when the data transmitted on the first serial path and the additional serial path are output by the same entity, the data thereon may be synchronized so that the first and second clock signals from the first de-serializer may be used by the additional de-serializer(s), where the additional clock signal then is the second clock signal. If this is not the situation, the additional de-serializer(s) may also be adapted to derive a separate first clock signal with a first frequency from the serial data path and derive the additional clock signal as a separate second clock signal with a second frequency, the second frequency being the pertaining first frequency divided by a predetermined integer.

Also, the same identifier and/or timing device may be used, or separate identifiers and/or timing devices may be used for different de-serializers.

When the same entity forwards the data on both the first serial path and the additional serial path(s), this entity may decide to forward full data packets on a single serial path. Alternatively, data packets may be split up into smaller parts, sometimes called flits, which are forwarded on the serial paths according to any scheme, such as a round robin scheme. Thus, the predetermined part of the packet may be forwarded on any of the serial paths and thus be output by any of the de-serializers. In this situation, the system will know that the packet is transmitted in this manner, and, subsequently to the outputting by the de-serializers, the data packet may be re-assembled if desired.

Naturally, the bus width of the parallel output of the de-serializer may be larger than a minimum data packet size, so that multiple predetermined parts of separate data packets can be output simultaneously. In the prior art systems, this situation could result in the data packets having the same time stamp.

In one embodiment of the present invention, the identifier is adapted to, preferably simultaneously, identify multiple of the parallel data paths in each of which at least a predetermined part of a data packet is output, and wherein the timing device is adapted to estimate, for each of the multiple of the parallel data paths, a point in time from the identified one of the parallel data paths and the second clock signal in accordance with which the parallel data is output to the identified one of the parallel data paths. Then, as the parallel paths of course are different, so will the points in time be, which is also desired, as the actual points in time of e.g. receipt on the serial path is different for the two data packets.

In that or another embodiment, the system further comprises a decoder having an input and an output, the decoder being adapted to receive data output on the parallel data bus, remove at least part of the data packet and output a remaining part of the data packet on the output.

As mentioned above, coding schemes may be used for a number of purposes, such as the providing of error check, or the dividing of a larger packet into smaller, such as equal size, parts which are forwarded over a link. In the latter situation, the smaller parts may each be provided with a header describing, for example, whether this part is the first or second part of a packet. Especially when parts are marked as a first part of a packet, the identification of this part is especially easy, as only this header need be identified. In e.g. 6b/8b-coding, this header is a two-bit header, one bit of which indicates that the header is that of a part having the first part of a data packet. The parallel path on which this bit is output then is easily identified by the identifier.

A second aspect of the invention relates to a method of identifying a point in time of receipt of a data packet having a predetermined part, the method comprising:
receiving serial data from a serial data path,
deriving a first clock signal with a first frequency from the serial data path and
deriving a second clock signal with a second frequency, the second frequency being the first frequency divided by a predetermined integer,
outputting parallel data to a parallel data bus having a predetermined number of parallel data paths, the parallel data relating to the serial data, and the parallel data being output in accordance with the second clock signal,
identifying one of the parallel data paths in which at least a portion of the predetermined part is output, and
estimating the point in time from the identified one of the parallel data paths and the second clock signal.

As mentioned above, the point in time may be related to a global or a local clock or even an integer within an interval of integers, where the time is identified by one of the integers, and where this integer changes (usually increases; but is wrapped around) for each clock period of the clock.

Also, the predetermined part may be any part of a packet. Usually, the predetermined part is a part which all packets of relevance has, as this makes the identification easier. Preferably, the predetermined part is a single bit, which may be the e.g. first or last bit of any desired part of a data packet. Usually, data packets conform to one or more standards also defining different standard parts of a data packet, such as addresses and the like.

Usually, receiving serial data from a serial data path means receiving the data one bit at the time.

The step of deriving the first clock signal with a first frequency from the serial data path may be performed on the basis of a frequency of identified zero point crossings of the first data, but also other methods are known.

In order to support that the bandwidth with which data is received on the serial link may be output from the de-serializer, the second clock signal preferably is the first frequency divided by the number of parallel paths, i.e. the width of the parallel bus.

When the parallel data is output, this is preferably controlled by the second clock signal so that the parallel data is output simultaneously on all parallel paths each time the second clock changes.

When the parallel data relates to the serial data, the overall amount of data received is that of the amount of data output. Data may be replaced, as long as no data is dropped. This bandwidth matching may vary over small amounts of time, if the de-serializer has or has access to storage. However, over time, the bandwidth matching is desired.

As mentioned above, any scheme may be used for determining to which of the parallel paths a bit received on the serial link should be forwarded. Usually, however, a round robin scheme is used.

When identifying the portion or the predetermined part, the identifier may assemble, from the parallel paths, part of the data packet and analyze these parts in order to identify the predetermined part or the portion. In other situations, such as where the data packets have identical or known sizes or where data packets have been split up into identical or known sizes, the identifier may know, from the very position of the last portion, where the next portion will be. Alternatively, this last portion may be used for guiding the identifier as to where to look for the next portion.

Typically, the portion will be a single bit, and this bit may be any bit of a data packet, such as the first bit of a packet header or a part thereof, such as an address. In the situation where the data packet conforms to a standard, analysis of the data packet may be performed to identify positions therein according to the standard in order to identify the bit/portion.

The identified parallel data path may be a single data path or e.g. a first one (lowest number for example) of those wherein the portion are output.

In one embodiment, the method further comprises one or more First-In-First-Out elements for receiving data from the parallel data paths and outputting data according to a third clock signal. As mentioned above, the use of separate clock domains has certain advantages, and data may be dropped or not across this clock boundary.

In that or another embodiment, the method further comprises the steps of:
receiving additional serial data from one or more additional serial data paths, and
outputting additional parallel data to an additional separate parallel data bus having a predetermined number of additional parallel data paths, the additional parallel data relating to the additional serial data.

As is the situation above, no data is preferably dropped, but data may be replaced.

In this embodiment, the above identifying and estimating steps may also take the parallel data of this additional data into account, or separate identifying and estimating steps, such as the steps of:
identifying one of the additional parallel data paths in which
    at least a portion of the predetermined part is output, and
estimating the point in time from the identified one of the additional parallel data paths and an additional clock signal in accordance with which the additional parallel data is output to the identified one of the additional parallel data paths may be performed for this additional data in addition to that of the above parallel data.

Also, the outputting and identification of the parallel data may be performed on the basis of the above second clock signal, which then is the additional clock signal, or the method may comprise the additional steps of deriving a separate first clock signal with a first frequency from the additional serial data path and deriving a separate second clock signal, which then is the additional clock signal, with a second frequency, the second frequency being the first frequency divided by a predetermined integer. The first situation may be preferred when the data forwarded on the serial links are output by the same entity (computer, server or the like) and/or are synchronized in time. The second situation may be preferred when the data forwarded on the serial links are output by different entities and thus not synchronized.

Also with this de-serialization may any scheme be used for determining on which of the parallel paths to output a received bit.

In one embodiment, the identifying step comprises identifying multiple of the parallel data paths in each of which at least a predetermined part of the predetermined part is output, and wherein the estimating step comprises estimating, for each of the multiple of the parallel data paths, a point in time from the identified one of the parallel data paths and the second clock signal in accordance with which the parallel data is output to the identified one of the parallel data paths. This may be the situation where the overall bus width exceeds the minimum data packet size.

In a final embodiment, the method further comprises the steps of receiving data output on the parallel data bus, removing at least part of the data packet and outputting a remaining part of the data packet on the output. This may be the above-mentioned de-coding of previously coded data packets.

Figure 2:
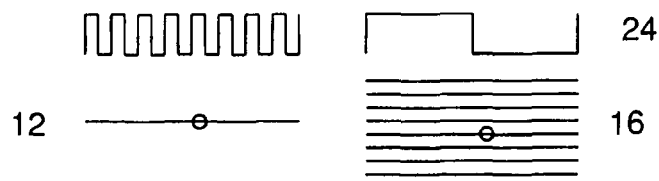

In the following, preferred embodiments of the invention will be described with reference to the drawing, wherein:
 FIG. 1 illustrates a prior art time stamping set-up,
 FIG. 2 illustrates the correlation between a point in time on the serial link and the point in time and lane number on the parallel link,
 FIG. 3 illustrates a first embodiment of a time stamping set-up according to the present invention, and
 FIG. 4 illustrates a second embodiment receiving data on multiple serial links.

FIG. 1 has been described above.

Figure 3:
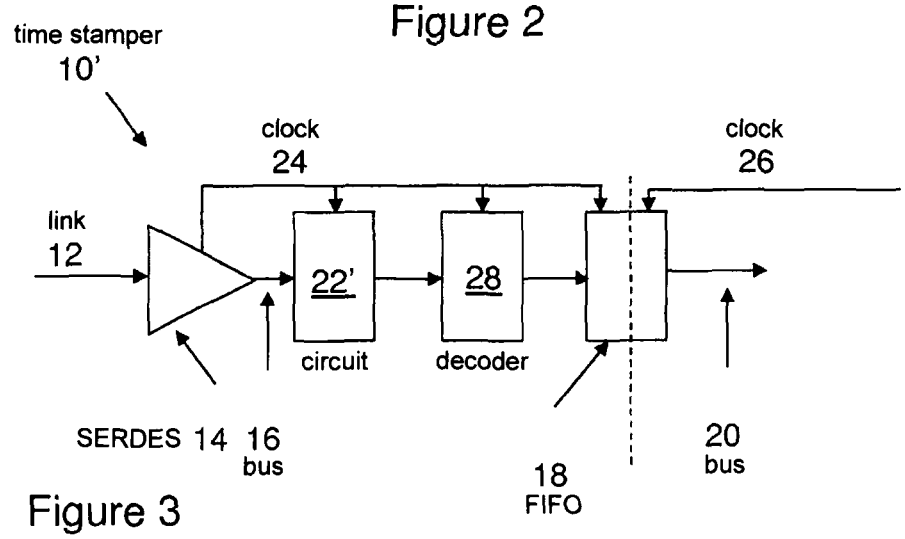
Figure 4:
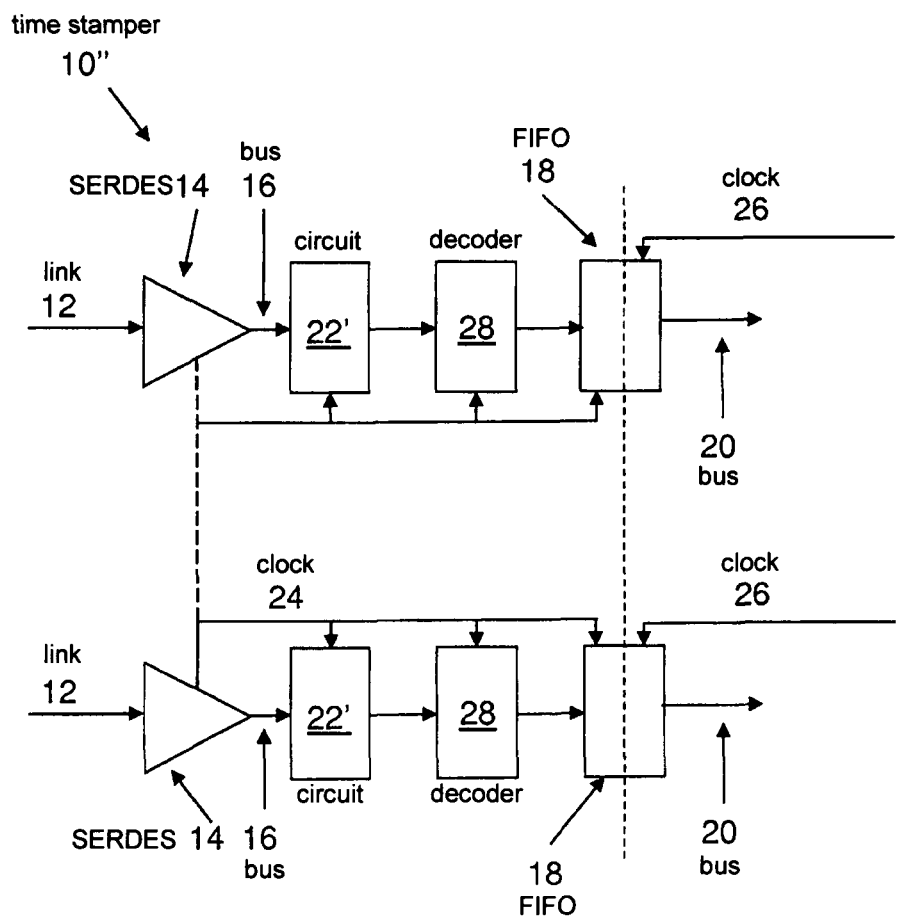

In FIG. 3, a number of identical elements to those described above in relation to FIG. 1 are used or may be used in the time stamper 10'. Thus, the data packets or other types of digital information is transmitted on the serial link 12 and is converted into parallel data and fed onto a parallel data bus 16 in order to reduce the frequency required of the analyzing circuits. This conversion again may be performed in the Serializer/Deserializer or SERDES 14 of the time stamper 10'. The de-serializer 14 again derives the clock signal from the link 12, divides this by the width of the bus 16 and outputs the data on the bus 16 according to this reduced clock signal 24, which is also output.

In this embodiment, the information on the bus 16 is fed to a time stamping circuit 22' which identifies on which of the parallel lanes or conductors of the bus 16 a predetermined part of a packet, such as the packet header, is present.

It is noted that time stamping may be performed on the basis of any part of a data packet, such as the header. Thus, the circuit 22' may be searching for a first bit or a first part or merely a predetermined part of a packet.

As the circuit 22' is timed by, or at least receives, the clock 24, it is able to, when no data is dropped between receipt by the SERDES 14 and the circuit 22', determine or estimate e.g. the time of receipt of this part of the data packet by the SERDES 14.

Usually, a SERDES 14 outputs the received data on the bus 16 in a round robin manner. If this is not the situation, the circuit 22' may desirably know the order in which the SERDES 14 outputs received bits on the lanes/conductors of the bus 16, in order to be able to convert a lane/conductor number and clock time on clock 24 to a time (clock time on bus 12) of receipt.

The circuit 22' aims to convert a clock time of clock 24 and a lane/conductor number on bus 16 into a time relating to the signal on the bus 12. When the same part of different data packets is "timed", the relative points in time of receipt may be determined and the packets handled correspondingly.

As mentioned above in relation to FIG. 1, the de-serialized data may then be fed to a number of asynchronous FIFOs 18 in order to allow the data to flow from one clock domain (clock 24) to another clock domain (clock 26).

After the circuit 22', such as before or after the FIFOs 18, a decoder 28 may be provided for removing a coding of the serial data received. This coding may be e.g a 64*b*/66*b* coding or a 6*b*/8*b*-coding. This decoding is controlled by the clock 24 or the clock 26.

It is noted that it is desired that no data is dropped between receipt by the SERDES 14 of data from the link 12 and the circuit 22'. Clearly, if data is dropped between two data packets received by the SERDES 14 from the link with a time difference of T, the packets may be timed by the circuit 22' with a time difference of less than T.

Instead of not dropping data, such undesired data may be replaced so that the overall amount of data received by the SERDES 14 in each data packet and/or between two data packets is the same as that received by the circuit 22'. Such data may be idle packets transmitted on the link 12 or additional headers, such as headers used in an encoding scheme, such as the 64*b*/66*b* encoding, VLAN headers or the like. Such data may be replaced by the same number of bits/bytes or are otherwise retained when transmitted to the circuit 22'. The circuit 22' may output the data received or may output reduced data where such headers, idle packets or the like is removed, such as to reduce the bandwidth used on the data bus on which this data is output.

In one situation, information relating to the time stamp may be introduced into the data packet when output from the circuit 22'. This information may replace other parts of the data packet, idle packets or may be provided in addition to the information/data output on the bus 16.

Naturally, the data packets transmitted on the bus 16 need not be transmitted through the circuit 22'. The circuit 28, the FIFOs 18 and/or other circuits may be connected to receive the data packets directly from the bus 16. In that situation, the circuit 22' may output the time stamp information either on the bus 16 or from another output (not illustrated) thereof.

FIG. 2 illustrates a manner of correlating a point in time on the serial link 12 to the point in time of the clock 24 and lane number on the bus 16. As described, the clock signal 24 has a frequency being the frequency of the clock on the link 12 divided by the number of lanes on the bus 16. In FIG. 2, this number is 8. Thus, the frequency of the signal 24 is that of the link 12 divided by 8. Clearly, it is possible to correlate the point in time of receipt of a bit (circle) on the bus 12 to a point in time of the clock 24 and the lane number on the bus 16, as 8 bits will be output simultaneously on the bus 16, but on different lanes, and these 8 bits will have been received at different points of time from the link 12.

FIG. 4 illustrates an embodiment 10" wherein data packets are received on multiple links 12. The data packets forwarded on the links 12 may be forwarded by the same element or different elements. All data packets may be transmitted on one of the links 12 only, or data packets may be forwarded partly on one link 12 and partly on the other link 12, so that the total, received data packet may be assembled from the data output by both SERDES 14. This is not significant for the operation of this part of the system.

The data from each link 12 is received and de-serialized by a SERDES 14 and then output to a parallel bus 16 and fed to a circuit 22' for time stamping. The circuits 22' may be controlled by the clock signal 24 output from a single SERDES 14, which typically may be the case when the data received from the links 12 are output by the same element and thus are transmitted synchronously. Alternatively, each circuit 22' may receive the clock 24 from the SERDES 14 from which it also receives data (hatched lines in FIG. 3).

Naturally, an overall point in time may be set for all SERDES 14 or circuits 22', where the clock(s) 24 may then be used for increasing the point in time, so that the phases of the clocks may be different but the overall point in time at least almost the same.

In this embodiment, all received packets are time stamped independently of on which link they are received, and independently of whether each packet is sent on only one of the links 12 or both. The circuits 22' will all search for the predetermined part of a data packet and, when identified, will output the timing information. This information may then follow the packet independently of if output on one of the busses 16, one of the circuits 22' or multiple such busses/circuits and thereafter assembled on to a single bus or the like.

Naturally, multiple such predetermined parts of more than one data packet may be identified at the same time on the bus 16. In that situation, it is noted that when the time stamp information relates to both the overall point in time of the time signal 24 as well as the lane/conductor number on the bus 16, different points in time will still be determined.

The invention claimed is:

1. A system for identifying a point in time of receipt of a data packet having a predetermined part, the system comprising:

a de-serializer for:

receiving serial data from a serial data path, deriving a first clock signal with a first frequency from the serial data path and deriving a second clock signal with a second frequency, the second frequency being the first frequency divided by a predetermined integer, outputting parallel data to a parallel data bus having a predetermined number of parallel data paths, the parallel data relating to the serial data, and the parallel data being output in accordance with the second clock signal, an identifier for identifying one of the parallel data paths in which at least a portion of the predetermined part is output, a timing device for estimating the point in time from the identified one of the parallel data paths and the second clock signal, wherein a scheme is known for controlling on which of the parallel data paths, data is outputted, then the second clock signal for outputting the predetermined part and the identified one of the parallel data paths are used to calculate the point in time of the first clock signal for receiving the predetermined part of the data packet in the serial data path.

2. The system according to claim 1, further comprising one or more First-In-First-Out elements for receiving data from the parallel data paths and outputting data according to a third clock signal.

3. The system according to claim 1, further comprising:
one or more additional de-serializers, each for:
   receiving serial data from a separate serial data path,
   outputting parallel data to a separate parallel data bus having a predetermined number of parallel data paths, the parallel data relating to the serial data, and the parallel data being output in accordance with an additional clock signal,
wherein the identifier identifies one of the parallel data paths in which at least a portion of the predetermined part is output, and
wherein the timing device estimates the point in time from the identified one of the parallel data paths and the additional clock signal in accordance with which the parallel data is output to the identified one of the parallel data paths.

4. The system according to claim 1, wherein the identifier identifies multiple of the parallel data paths in each of which at least the predetermined part of a data packet is output, and wherein the timing device estimates, for each of the multiple of the parallel data paths, the point in time from the identified one of the parallel data paths and the second clock signal in accordance with which the parallel data is output to the identified one of the parallel data paths.

5. The system according to claim 1, further comprising a decoder having an input and an output, the decoder receives data output on the parallel data bus, removing at least part of the data packet and outputting a remaining part of the data packet on the output.

6. A method of identifying a point in time of receipt of a data packet having a predetermined part, the method comprising:
   receiving serial data from a serial data path,
   deriving a first clock signal with a first frequency from the serial data path and
   deriving a second clock signal with a second frequency, the second frequency being the first frequency divided by a predetermined integer,
   outputting parallel data to a parallel data bus having a predetermined number of parallel data paths, the parallel data relating to the serial data, and the parallel data being output in accordance with the second clock signal,
   identifying one of the parallel data paths in which at least a portion of the predetermined part is output, and
   estimating the point in time from the identified one of the parallel data paths and the second clock signal,
wherein a scheme is known for controlling on which of the parallel data paths, data is outputted, then the second clock signal for outputting the predetermined part and the identified one of the parallel data paths are used to calculate the point in time of the first clock signal for receiving the predetermined part of the data packet in the serial data path.

7. The method according to claim 6, further comprising the step of one or more First-In-First-Out elements receiving data from the parallel data paths and outputting data according to a third clock signal.

8. The method according to claim 6, further comprising the steps of:
   receiving additional serial data from one or more additional serial data paths,
   outputting additional parallel data to an additional separate parallel data bus having a predetermined number of additional parallel data paths, the additional parallel data relating to the additional serial data, and the parallel data being output in accordance with an additional clock signal,
   identifying one of the additional parallel data paths in which at least a portion of the predetermined part is output, and
   estimating the point in time from the identified one of the additional parallel data paths and the additional clock signal in accordance with which the additional parallel data is output to the identified one of the additional parallel data paths.

9. The method according to claim 6, wherein the identifying step comprises identifying multiple of the parallel data paths in each of which at least the predetermined part of a starting header is output, and wherein the estimating step comprises estimating, for each of the multiple of the parallel data paths, the point in time from the identified one of the parallel data paths and the second clock signal in accordance with which the parallel data is output to the identified one of the parallel data paths.

10. The method according to claim 6, further comprising the steps of receiving data output on the parallel data bus, removing at least part of the data packet and outputting a remaining part of the data packet on the output.

* * * * *